May 9, 1944.   R. A. RICHARDSON   2,348,307
DOUBLE WINDOW PANE
Filed Dec. 3, 1942
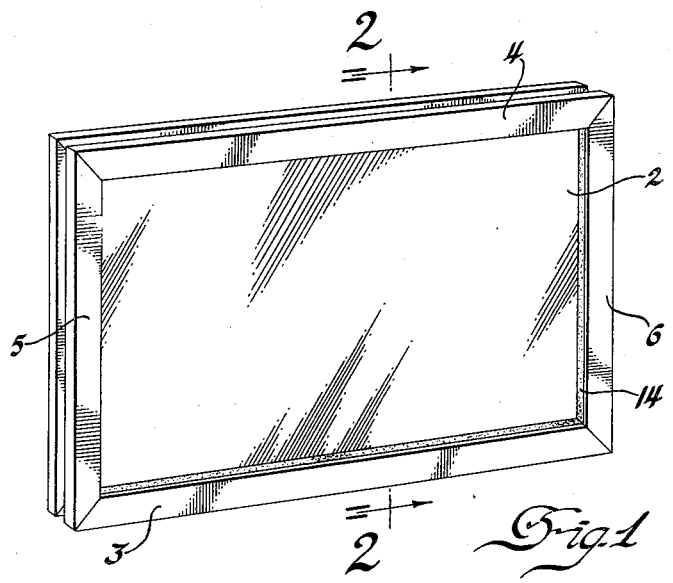
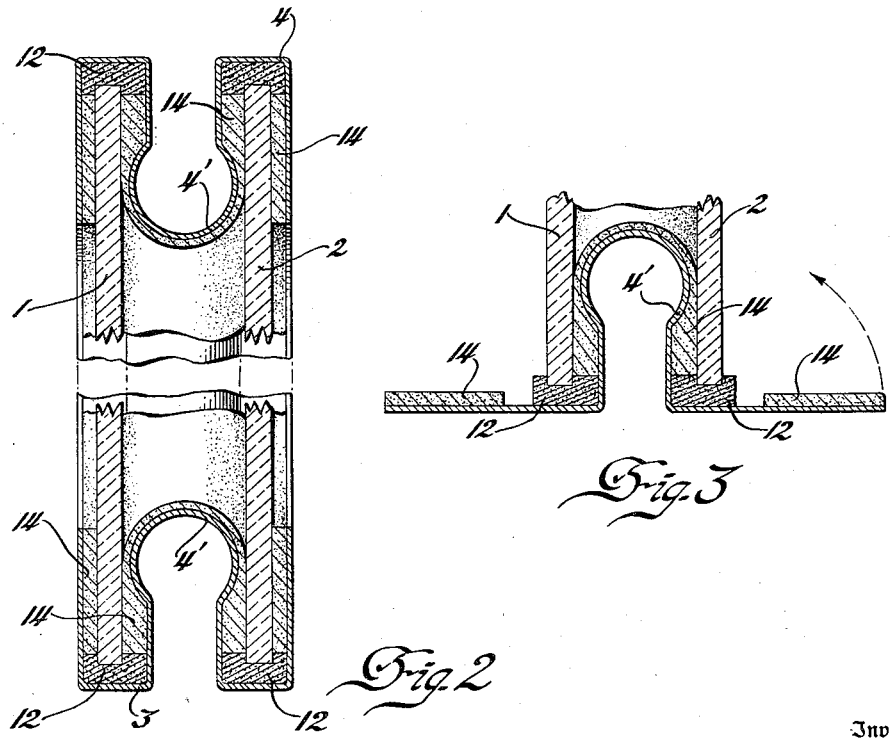
Inventor
Ralph A. Richardson
By Blackmore, Spencer & Flint
Attorneys Patented May 9, 1944

2,348,307

UNITED STATES PATENT OFFICE 2,348,307

DOUBLE WINDOWPANE

Ralph A. Richardson, Detroit, Mich., assignor to General Motors Corporation, Detroit, Mich., a corporation of Delaware Application December 3, 1942, Serial No. 467,677

4 Claims. (Cl. 20—56.5)

This invention relates to a multiple windowpane structure having a heat insulating space for air or some other medium between the panes.

More specifically, it relates to improvements in the structures of the double windowpanes which were the subjects of U. S. Patents 2,173,649, 2,173,664, 2,278,694 and others in which the panes are sealed in a frame by some sort of thermoplastic sealing compound.

In U. S. Patents 2,173,649 and 2,173,664 the use of bitumen or asphalt as a suitable sealing compound was disclosed, whereas in U. S. Patent 2,278,694 the use of vinyl acetate as a suitable sealing compound was disclosed.

Along with other desirable qualities, the ideal sealing compound should be strongly adhesive and highly resistant to any infiltration of moisture from the atmosphere to the space between the panes, but no such sealing compound is known to the applicant.

It has been found that vinyl acetate has a better adhesion to glass and metal over a wide temperature range than asphalt, but is somewhat hygroscopic whereas asphalt is not, but asphalt reacts with putty normally used as a glazing material, while vinyl acetate is inert and reacts neither with putty nor with asphalt. Since vinyl acetate is hygroscopic, it permits some seepage of moisture or vapor from the outside atmosphere to the space between the panes with consequent fogging of the inside surfaces of the panes.

The object of the invention is a seal for the insulating air space of a multiple windowpane structure which provides for strong adhesion of the parts through a wide temperature range and a minimum infiltration of moisture to the space between the panes.

A more specific object of the invention is a seal which combines the aforesaid advantages of both vinyl acetate and asphalt.

The above and other objects of the invention will be apparent as the description proceeds.

According to the invention, parts of a seal of strongly adhesive but hygroscopic sealing compound which are respectively exposed to the outside atmosphere and the space between the panes are separated by a moisture dam of non-hygroscopic sealing compound impervious to moisture.

The drawing shows a construction according to the invention.

In the drawing:

Figure 1 is a perspective view of a completed multiple windowpane.

Figure 2 is an enlarged sectional view on line 2—2 of Figure 1.

Figure 3 shows an enlarged sectional view of an alternative form of frame construction.

Referring now more particularly to Figures 1 and 2, the panes 1 and 2 of glass or other transparent material are held in separated relationship in a frame of suitable material such as copper and consisting of side members 3 and 4 and end members 5 and 6. The side and end members are cut with mitered ends from suitable strip copper rolled to the section shown in Figure 2, with a separating ridge 4' of bulbous cross sectional contour between the channels for the panes.

When the panes are in their proper positions in the channels there is space for sealing means in the channels below the panes and between the panes and the sides of the channels.

A vapor dam 12 consisting of a strip of plastic material such as asphalt, which is impervious to water vapor and which may be extruded in the desired section, is laid in the bottom of the channels. Above the vapor dam 12 a suitable quantity of a plastic 14, such as vinyl acetate, which is strongly adhesive to metal and glass, and which will not react with the asphalt or putty normally used as a glazing material, is placed. The two panes are then inserted in their respective channels of one side strip and the opposite side strip is placed over the opposite edges of the panes, and the ends of the panes are then in turn set into the end strips.

Alternatively, the strip material of the frame may be rolled to the section shown in Figure 3, with the asphalt vapor dams 12 and the vinyl acetate 14 laid as shown before the strip material, in position over the edges of the panes 1 and 2, is bent as indicated to the same section shown in Figure 2.

In either case the assembly is then squeezed together to bring all the parts into their proper position while heated to such extent as may be necessary to soften the plastics sufficiently for this to be accomplished.

I claim:

1. A multiple windowpane structure having a frame of strip material for its edges, spacing means between the panes, and a compound seal of which one constituent provides a water vapor dam which prevents infiltration of moisture from the atmosphere to the space between the panes, and another constituent securely bonds the parts together; the first of said constituents being a plastic material impervious to moisture, extending between each pane and the frame, and the other of said constituents being a less impervious but more adhesive plastic material extending between other parts of each pane and the frame.

2. The combination according to claim 1, in which the plastic material impervious to moisture is asphalt.

3. The combination according to claim 1, in which the more adhesive plastic material is vinyl acetate.

4. The combination according to claim 1, in which the plastic material impervious to moisture is asphalt and the more adhesive plastic material is vinyl acetate.

RALPH A. RICHARDSON.